United States Patent [19]

Senzani

[11] Patent Number: 4,731,145
[45] Date of Patent: Mar. 15, 1988

[54] METHOD FOR PRODUCING SHEETS OF WOOD WITH DIFFERENTIATED POROSITIES

[76] Inventor: Giovanna Senzani, Via Gramsci No. 34, Modigliana, Forli, Italy

[21] Appl. No.: 755,569

[22] Filed: Jul. 16, 1985

[51] Int. Cl.⁴ .............. B32B 31/18

[52] U.S. Cl. .............. 156/264; 144/348; 144/350; 144/351; 144/352; 428/106; 428/151

[58] Field of Search .............. 156/264; 144/345, 346, 144/348, 350, 351, 352; 428/106, 151, 537.1

[56] References Cited

U.S. PATENT DOCUMENTS

| | | | |
|---|---|---|---|
| 3,205,111 | 9/1965 | Williamson et al. | 144/348 |
| 3,312,582 | 4/1967 | Allan et al. | 144/352 |
| 3,418,195 | 12/1968 | Allan | 144/352 |
| 4,388,133 | 6/1983 | Hirao et al. | 156/264 |

FOREIGN PATENT DOCUMENTS

| | | | |
|---|---|---|---|
| 563628 | 6/1960 | Belgium | 156/264 |
| 2043803 | 2/1971 | France | 428/106 |

*Primary Examiner*—Caleb Weston
*Attorney, Agent, or Firm*—Fleit, Jacobson, Cohn & Price

[57] ABSTRACT

A method for producing sheets of precomposed wood, with differentiated porosities, designed to imitate rotary-cut veneers and/or sheared sheets of natural wood. According to the method claimed herein, sheets of wood with differentiated porosities are obtained by cutting or shearing a block of precomposed wood, made up of sheets of natural wood having a first degree of porosity disposed between sheets of precomposed wood having a different degree of porosity, so as to imitate the typical graining and fibre structure of natural wood.

24 Claims, 22 Drawing Figures

METHOD FOR PRODUCING SHEETS OF WOOD WITH DIFFERENTIATED POROSITIES

BACKGROUND OF THE INVENTION

This invention concerns the veneer production sector; in particular, it concerns a method for producing sheets of precomposed wood with differentiated porosities, as well as the sheets of wood thus obtained, which can be used as veneers for covering furniture and the like.

As is known the growing demand for natural wood veneers and the decreasing availability of valuable species of timber, has led to the development of methods for producing precomposed wood veneers, obtained from a given species of wood, of lesser value and widely available, for the purpose of producing veneers made of precomposed wood imitating veneers of more valuable species of wood.

The known methods start substantially from a single type of wood sheet which, after being suitably colored or dyed, is then used for reconstructing an artificial trunk or block of precomposed wood, by glueing together sheets of differently colored and/or differently dyed wood, so as to imitate as closely as possible the patterns of the various types of grain in the wood.

All the known and currently used methods are therefore based on the common principle of imitating the grain of the wood merely by means of the differentiated color effect of the basic sheets of wood used. Special effects achieved by shading the color may improve the degree of imitation of the grain, however the sheets of precomposed wood and the veneer obtained from them are subject to limits due to the actual methods used; these limits are consequential to the obvious forming of a grain pattern achieved merely by means of color. Consequently, with the known methods, the end product which is obtained reveals its non-natural origin, is easily recognizable from that obtained from a natural log of wood, and is consequently unappreciated or ignored due to its lesser value, by certain categories of furniture manufacturers.

The general scope of this invention is to provide a method for producing sheets of precomposed wood, in such as way as to imitate as closely as possible, not only the typical pattern of the grain of sheets of natural wood, but even the fibre structure of the wood which is to be imitated, with effects that can without a doubt be defined as remarkable. According to this invention, the problem was viewed from a completely opposite standpoint, never as yet taken into consideration, and precisely by the fact that the grain of natural wood is due not only to the alternation of the various fibrous rings of annual growth of the tree trunks, but also by the fact that there are two fundamental layers in each annual growth rings, one richer in fibre than the other and, therefore, with a more homogenous appearance and structure, and very often differently colored, so as to show different degrees of porosity in the structure of the wood, in the different seasons of annual growth.

This differentiation between the layers of seasonal growth, in each annual growth ring, is accentuated when the sheets of wood are varnished, by the greater or lesser penetration of the varnish into the layers with different structures and porosities.

A further scope of this invention is to provide a method for producing sheets of precomposed wood, designed to imitate veneers of natural wood, which ensure constant repeatability of the patterns of the grain, unlike natural veneers where, due to the differences between one log and another, and in the same log itself, it is not always possible to obtain sheets of veneer with the same pattern; a fact which makes veneers obtained from sheets of precomposed wood even more qualifiable in that the repeatability of the pattern makes them very practical for use in the mass-production of furniture. It is pointed out that, for the scopes of this description, the term "sheet of natural wood" is used to indicate a sheet of wood obtained directly by rotary cutting or shearing a tree trunk, and that the term "sheet of precomposed wood" is used to indicate a sheet of wood obtained by shearing from a block made up of sheets of wood suitably glued and pressed together.

SUMMARY OF THE INVENTION

According to the general principle of this invention, a method is provided for producing sheets of precomposed wood, with differentiated fibre structure and porosity, designed to imitate sheets of natural wood, according to which the final sheets of precomposed wood are cut from a block of wood obtained by overlapping numerous sheets of wood glued together, characterized by the following stages:

(a) preparing basic sheets of natural wood having a homogenous structure and a first degree of porosity;

(b) preparing basic sheets of precomposed wood having a fibre structure with a higher degree of porosity than the first ones;

(c) forming a block of precomposed wood by overlapping basic sheets of natural wood having said first degree of porosity, and basic sheets of precomposed wood having said second degree of porosity, suitably provided with an adhesive substance;

(d) making the sheets adhere together by exerting pressure on the block;

(e) cutting from said block, sheets of precomposed wood in a direction parallel to a pre-established cutting plane, thereby obtaining final sheets of wood with grains which present alternating bands of different widths, appearance and/or porosity.

Starting from the above described basic method the invention envisages numerous alternatives tending to differentiate and to further improve the imitation of natural wood, or which can be utilized according to the species of wood that is to be reproduced; in short, such alternatives include the possibility of using basic sheets of natural wood and basic sheets of precomposed wood obtained from the same species of wood, or from different species of wood; of maintaining the same natural color of the original wood for each single sheet, or of coloring or dyeing the various basic sheets with a base color corresponding to that of the species of wood to be imitated. It is also possible, during the preparation of the precomposed block, to alternate one or more sheets of one type and/or of one color and/or thickness, with one or more sheets of a different type and/or color and/or thickness, with the possibility of using either transparent or suitably colored glue, according to need; all the possible variations are claimed within the sphere of this invention, in order to enable the best possible adaptation of the method to the desired final product.

BRIEF DESCRIPTION OF THE DRAWINGS

The basic method according to this invention, and a few of its numerous possible variations, will be illustrated in greater detail hereunder, with reference to the accompanying drawings, in which.

DESCRIPTION OF THE INVENTION

Figure 1:
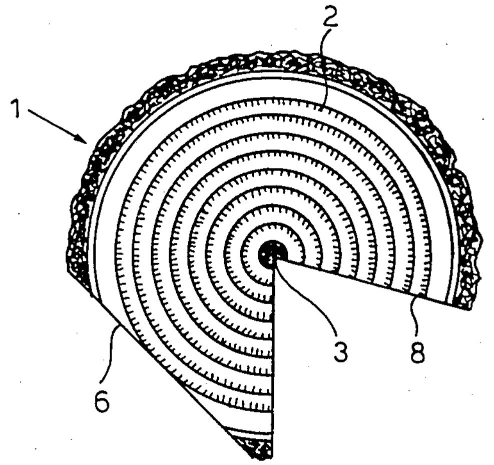
FIG. 1 represents a cross-sectional view of a tree trunk, showing the typical annual growth rings, and the possible radial and tangential cutting planes of the trunk itself.
Figure 2:
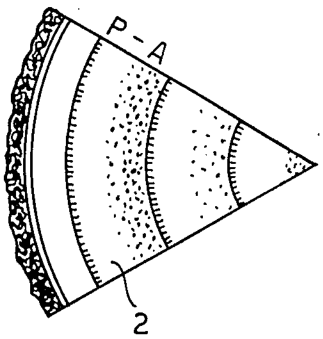
FIG. 2 shows an enlarged segment of the trunk of FIG. 1, in order to illustrate the different structure or porosity of the wood, in the different seasons of annual growth.
Figure 3:
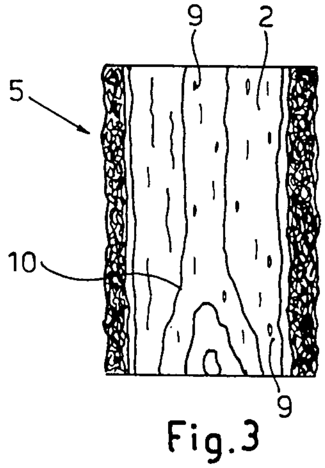
FIG. 3 shows the appearance of a possible sheet of natural wood, cut parallelly to a tangential plane of the trunk of FIG. 1.
Figure 4:
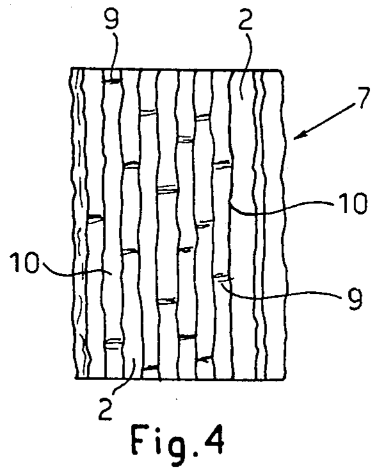
FIG. 4 shows the appearance of a possible sheet of natural wood, cut parallelly to a radial plane of the trunk of FIG. 1.

FIG. 1 shows a schematic representation of the classical cross-section of a tree trunk 1, showing the various annual growth rings 2, arranged concentrically around the pith 3. The enlarged cross-section of FIG. 2 shows, in turn, in greater detail, how in each of the plant's annual growth rings 2, there can be two layers pertaining to different periods of seasonal growth, that of Spring, P, and that of Autumn, A; the thickness P of Spring growth corresponds to a lighter and more fibrous structure of the wood and, therefore, more homogenous, whereas that of the Autumn, A, corresponds to a more porous structure which is sometimes darker in color, due to the more limited circulation of sap during this season. The various annual growth rings and the differentiation in the color and/or in the porous structure of the wood, in each season of growth, contribute to creating the classical grain of natural wood, a schematical representation of which is shown in FIG. 3 for sheets 5 cut parallelly to the tangential plane 6 of FIG. 1, and in FIG. 4 for sheets 7 cut parallelly to a radial plane 8. The two FIGS. 3 and 4 also show the appearance of the radial tracheae 9, that is to say, at right angles to the longitudinal direction of the fibres of the wood; in the case of FIG. 3, the tracheae 9 are cut crosswise, whereas in the case of FIG. 4, they are cut lengthwise, keeping their disposition substantially crosswise to the various layers of growth delimited by the dividing lines 10 between the various rings 2.

Figure 5:
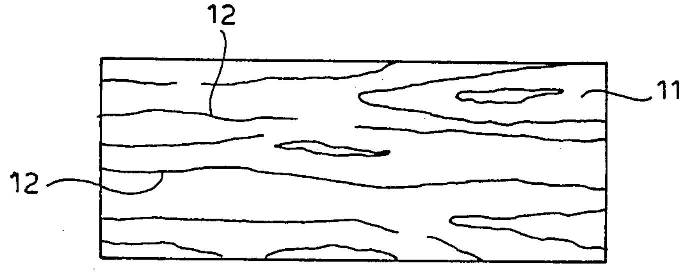
FIG. 5 shows the appearance of a possible sheet of natural wood, obtained by circumferentially shearing the trunk of FIG. 1, continuously and parallelly to the axis of the trunk itself.

Lastly, FIG. 5 shows the substantially homogenous appearance of a sheet of natural wood 11, obtained by rotary-cutting the trunk 1, that is to say, by cutting round the outside of the trunk, making it rotate continuously around its longitudinal axis; said sheet 11 has a substantially homogenous woodstructure, with the fibres substantially parallel and very close together due to the fact that they belong to the same period of growth, streaked by fine lines 12 in correspondence with the longitudinal channels of the trunk. Starting from these presuppositions, according to the invention, a method was created for producing sheets of precomposed wood also partly utilizing known techniques so as to achieve a realistic imitation of sheets of natural wood, in which the classical grain of the wood is achieved by means of a different porosity and fibre structure in the single layers, as in natural wood, combined, if required, with special effects obtained by coloring and/or using glues of different colors. The method according to the invention is based on forming a block of precomposed wood made up of sheets of natural wood combined with sheets of precomposed wood, having different degrees of porosity, so as to create a different fibre structure between one layer and another in the final sheets of precomposed wood cut from a block thus obtained. In particular, it was found that the sheets of natural wood, obtained by rotary cutting the trunks, are highly suitable for imitating layers of Spring growth which are less porous and of a more homogenous fibre structure, whereas sheets of precomposed wood obtained by means of conventional or improved systems are suitable for imitating the more porous layers of growth with a less homogenous appearance. This characteristic of the sheets of precomposed wood which is advantageously used in an original way, according to the invention, can be justified for example, by the fact that, composing a basic block, either with sheets or veneers rotary-cut and/or sheared or sliced from natural wood, shows the different patterns of the fibres in the wood and the various sap canals, giving the overall precomposed sheet, thus obtained, a higher degree of porosity, as compared to a sheet of natural wood obtained by rotary-cutting the natural trunk.

As mentioned previously, the final sheets of precomposed wood with differentiated porosity, according to this invention, are obtained by veneer-slicing a block made by utilizing at least two types of basic sheets, the first type of which, which we will refer to as LN, consists of sheets of natural wood having a first degree of porosity suitable for imitating the more homogenous and less porous fibre structure of the layer P, for example, the sheet of natural wood 11 of FIG. 5, and a second type, which we will refer to as LP, consisting of sheets of precomposed wood having a higher degree of porosity than the first, suitable for imitating the less homogenous and more porous structure of the layer A, due to the presence of numerous small cracks orientated in the direction of the longitudinal fibres of the wood.

Figure 6:
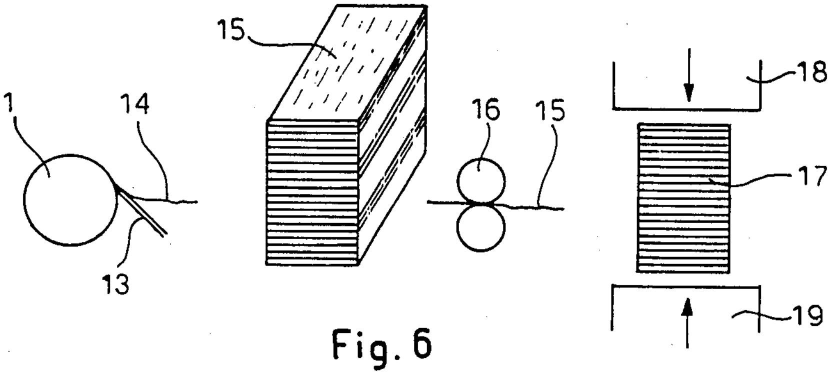
FIGS. 6 to 9 show a first method of obtaining sheets of precomposed wood which can be utilized in the method according to this invention.
Figure 7:
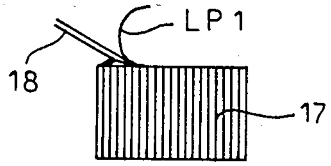
Figure 8:
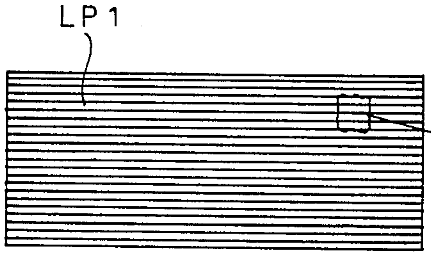
Figure 9:
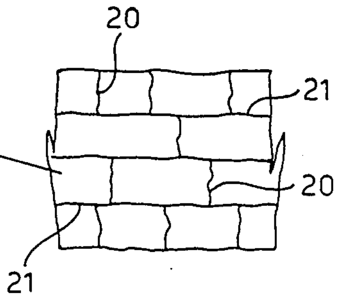

A first method for obtaining sheets of precomposed wood LP is shown in FIGS. 6 and 7 of the accompanying drawings, whilst FIGS. 8 and 9 show the basic precomposed sheet thus obtained, and respectively an enlarged detail of the latter. As can be seen from FIG. 6, a log of wood 1, of any given wood species, widely available and suitable for imitating more valuable wood, is rotary-cut, circumferentially and continuously, by means of a blade 13 arranged parallel to the longitudinal axis of the log 1 which is made to rotate continuously. A continuous strip of wood 14 is obtained, which is subsequently cut crosswise to form sheets 15 which are used for preparing the basic precomposed sheets LP1 as described hereunder. The sheets of wood 15 can either be used with their natural color, or can be suitably colored or dyed, by dipping in a dye bath, using basic colors which match that of the wood species to be imitated.

The natural-colored or, if necessary, dyed sheets 15 are made to pass through a glueing machine 16 in order to apply a layer of glue or other suitable adhesive substance on one or both faces of each sheet; merely by way of example, it is pointed out that there are currently available suitable glues based on urea, melamine or vinyl resins. The sheets 15 with the glue, are then stacked one on top of the other, maintaining the same direction of the fibres, in order to form a block of precomposed wood 17 which is subsequently placed between the surfaces 18 and 19 of a press, where it is held at a sufficiently high temperature for a sufficient length of time to allow the glue to harden and to form a compact block of wood.

The precomposed block 17 thus obtained, can now be utilized for preparing a first type of basic sheet of precomposed wood LP1; the basic block 17 is consequently tilted by 90° as shown in FIG. 7, so as to permit the slicing of the basic sheets LP1 according to a crosswise cutting plane, parallel to the direction of the fibres, that is to say, at right angles or forming a pre-established angle with the direction of the glueing plane of the single sheets 15 which make up the block of wood 17. In this way, a basic sheet of precomposed wood LP1 is obtained, which is made up of numerous strips placed side by side and glued together, belonging to the single sheets 15 making up the block of wood 17.

The sheets of precomposed wood LP1, used as basic sheets for the reconstruction or for imitating the more porous wood layers of the precomposed sheets making up the final product, have a higher degree of porosity with respect to the LN basic sheets of natural wood, for the following reasons: firstly, the longitudinal lines 21 corresponding to the joining or glueing surfaces between the sheets 15, constitute lines of interruption in the fibre structure, parallel to the direction of the wood fibres, in the same way as the porosity due to the various channels for circulation of the sap and nutritive substances; secondly, whenever the sheets 15 used for forming the basic block of precomposed wood 17 are sheets obtained by rotary-cutting of the trunk, as in the case of FIG. 6, or by slicing the trunk tangentially as in the case of FIG. 3, they may present radial tracheae 20, according to the species of wood initially used, in an orthogonal or crosswise direction to the thickness of the single sheets 15. As a result of the tipping up of the basic block 17, which arranges the cutting plane crosswise to the surfaces of adhesion of the sheets 15, the radial tracheae 20 are arranged on substantially parallel planes to the cutting or slicing plane of the sheets themselves. Thus, on the lateral faces of the basic sheets LP1, will appear a dense network of small longitudinal and crosswise cracks, cut in the direction in which they are orientated, and lying in the planes of the faces themselves. From experiments carried out it was found that this network of small cracks, which appear on the surfaces of the two faces of the basic sheets LP1, defines a sort of fibrous structure having a degree of porosity, with respect to the sheets of natural wood LN, suitable for simulating the more porous structure in each annual growth ring of the wood. From further tests carried out, according to the species of wood to be imitated, it was noted that in forming the basic block 17, either in combination, or not, with a basic coloring of the sheets 15, it was convenient to use transparent or white glue, or suitably colored glue, so as to create variegations or small irregular streaks in the final sheet obtained according to the method of this invention, which further improve the effect of natural wood.

FIGS. 10 to 14 show a second method for obtaining a basic sheet of precomposed wood, and the sheet of wood LP2 thus obtained, which constitutes a further development in the method illustrated previously.

Figure 10:
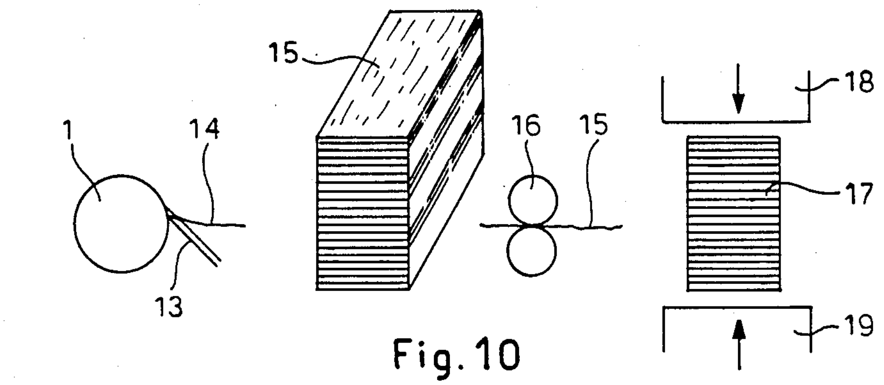
FIGS. 10 to 14 show a second method for obtaining sheets of precomposed wood, which can be used in substitution, or in combination with the first ones, in the method according to this invention.
Figure 11:
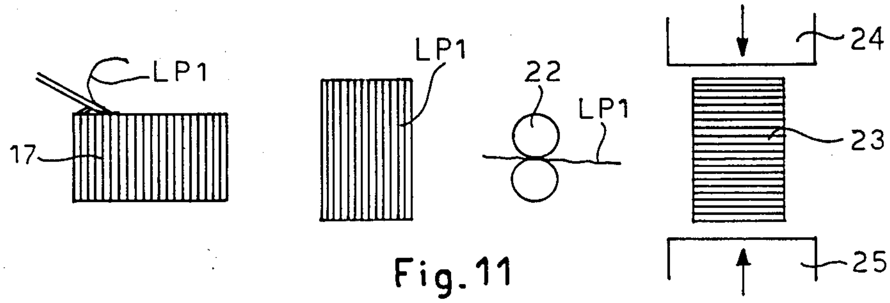
Figure 12:
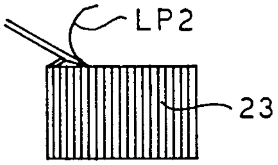
Figure 13:
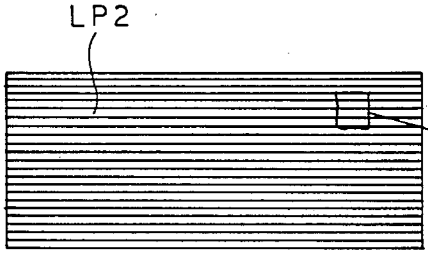
Figure 14:
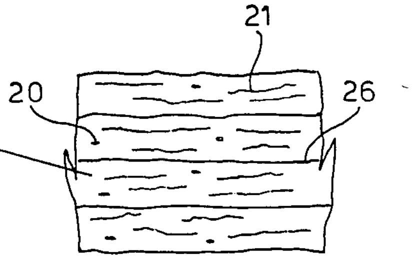
Figure 15:
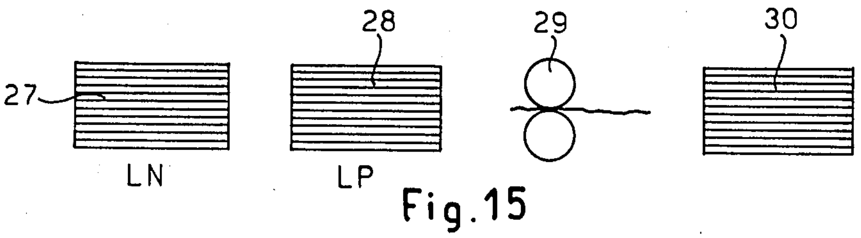
FIGS. 15 to 21 show different stages of the method according to this invention, in order to obtain sheets of precomposed wood, with differentiated porosity.

In this case again, as shown in FIG. 10, which substantially corresponds to the previous FIG. 6, and for which the same references have been used for similar or corresponding parts, a block 17 of precomposed wood is formed, as illustrated previously, and sheets of precomposed wood LP1 are cut, as shown in FIG. 11, which are then spread with glue 22, on one or both faces in order to form a second block 23 of precomposed wood; the block 23 is then placed between the surfaces 24 and 25 of a press for the necessary length of time for the glue to harden which makes the block compact once more. The block 23 is tilted by 90°, as shown in FIG. 12, and basic sheets LP2 of precomposed wood ar sliced from the latter, according to a crosswise cutting plane, that is to say, at right angles or forming a pre-established angle with the adhesion surfaces of the sheets LP1 in the block 23. FIGS. 13 and 14 show a view and an enlarged detail of this second basic sheet LP2 of precomposed wood. As shown in FIG. 14, the effect of this double composition of the blocks 17 and 23 and the subsequent slicing phases, give rise to a complex system of joining lines 21, 26 between the various thicknesses of the wood, always parallel to the direction of the fibres, and an arrangement of the tracheae or channels 20, this time at right angles to the plane of the sheet itself.

In this case as well, it is also possible to use colorless, white or variously colored glues in forming the precomposed block 23. It is also obvious that in the case of the basic sheet LP2, there is a greater degree of porosity due to the joining lines 21, 26 in the sheets, and to the tracheae 20 which appear on both faces of the precomposed sheet, with respect to the basic sheets LP1 of the previous example, and also to a certain widening action of the fibres caused by the cut in the single layers in two directions at right angles with each other.

The final result which can be obtained, as mentioned previously, depends upon numerous factors, such as the type or types of species of wood used in preparing the first and/or both the blocks of precomposed wood 17 and 23, the angle of the cutting plane of the sheets, the type and/or color of the glue used, the coloring of the sheets or part of the sheets 15 initially used for forming the block 1*e*, as well as other factors, such as for example, the appearance of the sheets initially used, that is to say, whether they are obtained by rotary cutting or slicing of the trunk, as explained previously, as well as the thickness and number of said sheets of natural wood and also those of the sheets of precomposed wood; it is pointed out, purely by way of example, that the thicknesses of the various sheets of natural and/or precomposed wood can be equal, in making up each block 17 and 23, or they may be different, advantageously ranging from 0.2 to 3 mm approximately, according to the specific requirements in imitating a given species of wood. From the second example of FIGS. 10, 14, it is possible to derive a third method for obtaining a basic sheet of precomposed wood LP3, by eliminating the 90° tilting operation of FIG. 12, and by slicing the basic sheets LP3 on substantially straight planes, as the planes on which the sheets of wood 15 lie, that is to say, with cutting planes parallel or forming a pre-established angle with the planes on which the aforesaid sheets 15 lie. In this way, it is possible to obtain a basic precomposed sheet LP3 with an effect of finer porosity than in the previous methods which can be advantageously used either on its own or in combination with the other basic sheets of precomposed wood LP1 and LP2, in order to achieve a better imitation of certain wood species.

The remaining figures from 15 to 25 serve to describe and illustrate the more characterizing part of the method according to the invention, and the end product which can be obtained. Different piles of sheets of wood are prepared, for example, a first pile 27 of sheets of natural wood LN, belonging to the same species of wood, or combinations of different species of wood, as the case may be, and a second pile 28 of sheets of precomposed wood LP which can either be of the type LP1, LP2, LP3 or a combination of the latter, in which case the piles of sheets should be stacked beforehand, in an order of succession established by a special programme. The thicknesses of the sheets LN and LP belonging to each pile or to both piles 27 and 28 may also be identical or may vary according to a programme pre-established by the manufacturer, depending upon the type of species of wood to be imitated.

Figure 16:
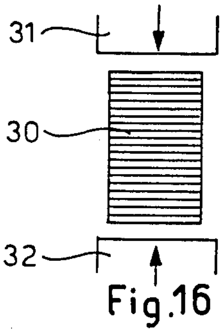
Figure 17:
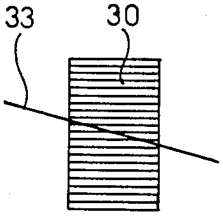
Figure 18:
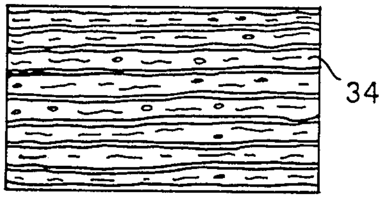
Figure 19:
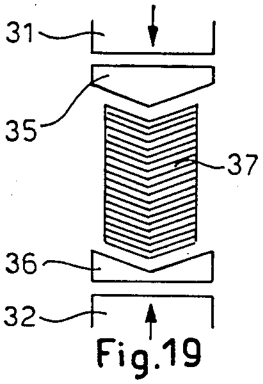
Figure 20:
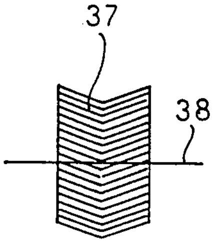
Figure 21:
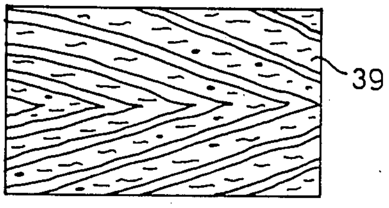
Figure 22:
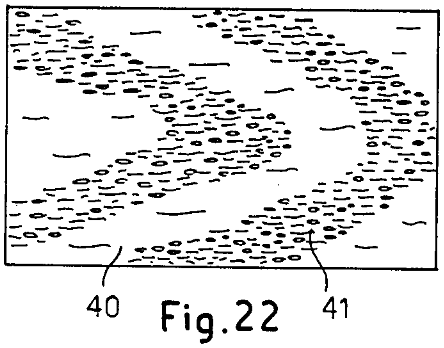
FIG. 22 shows an enlarged detail of a sheet of precomposed wood, obtained by means of the method according to the invention.

After having made up the two piles 27, 28 of sheets of natural wood LN and of precomposed wood LP, as previously described, a final block of wood 39 is formed by alternately feeding through a glueing machine, according to a pre-established sequence, sheets of natural wood LN taken from the pile 27 and sheets of precomposed wood LP taken from the pile 28, or by combining in other possible ways sheets of natural wood and sheets of precomposed wood, in order to obtain a final block 30 made up of layers presenting a different porosity and/or with special effects of color or shades of color, so as to imitate as closely as possible the structural differences in a given species of wood, due to the different periods of growth in a natural tree trunk. Once the block 30 has been formed, it is placed between the surfaces 31 and 32 of a press, and left for a sufficient length of time to enable the glue to harden completely. This compact block is then used for slicing the sheets of precomposed wood 34 suitable for constituting the final veneer, with the characteristics of the wood to be imitated; the pattern of the grain thus obtained depends not only upon the method of forming the precomposed block of wood, but also upon any intentional deformations in the block, made under the press. FIGS. 16, 17 and 18 in fact, show the case in which the block 30 maintains a flat disposition of the single sheets of wood, conforming to the surfaces 31 and 32 of the press. Whereas, FIGS. 19, 20 and 21 show the case in which a block of precomposed wood 37, made up in the same way as the previous one, is deformed by inserting shapes 35 and 36 between the surfaces of the press and the block itself. In this case, depending upon the degree of deformation given to the block 37 and according to the direction of the cutting plane 38, sheets 39 are obtained which constitute the end product, with curved or differently-patterned grain, according to requirement. In all the cases, as shown by way of example in the enlarged detail of FIG. 22, final sheets of precomposed wood are obtained, which imitate any type or species of natural wood, with a very lifelike effect which, in certain cases, is difficult to distinguish, even by experts. In fact, thanks to the use of sheets of wood with differentiated porosity, it is possible to obtain end products with grains made up of bands 40 having a homogenous fibre structure, characteristic of a certain period of seasonal growth, and bands 41 with a greater degree of porosity whose structure resembles that of a subsequent period of seasonal growth. It is clear, that what has been described and shown, with reference to the accompanying drawings, is given purely by way of example in order to illustrate the general concepts of this invention which consist substantially in the use of sheets of natural wood, however obtained and/or colored or dyed and sheets of precomposed wood, however obtained and/or colored or dyed, for forming a block of precomposed wood in which one or more types of sheets of natural wood are alternated with one or more sheets of precomposed wood according to a pre-established order, to obtain, by slicing, sheets of precomposed wood with differentiated porosity which are wholly similar to the typical wood structures of the types of wood to be imitated; for example, excellent results have been achieved in imitating wood belonging to the cupuliferae, ulmaceae and oleaceae families utilizing wood belonging to the bombaceae, meliaceae and sterculiaceae families although, following the principles of this invention, it is also possible to imitate other species of wood.

What is claimed is:

1. Method for producing sheets of precomposed wood with differentiated porosity, suitable for imitating sheets of natural wood, according to which the final sheets of precomposed wood are sliced from a block of wood obtained by overlapping numerous sheets of wood glued together, comprising the following steps:

preparing natural wood sheets having a homogenous structure and a first degree of porosity;

preparing first precomposed wood sheets having a fibrous structure and a second degree of porosity, higher than said first degree of porosity;

forming a first block of precomposed wood by overlapping said natural wood sheets and said first precomposed wood sheets, sutiably provided with an adhesive substance;

making the sheets adhere to one another by exerting pressure on the first block;

slicing second precomposed wood sheets from said first block, in a direction parallel to a pre-established cutting plane;

forming a second block of precomposed wood by overlapping said natural wood sheets and said second precomposed wood sheets, suitably provided with an adhesive substance;

making the sheets adhere to one another by exerting pressure on the second block; and slicing third precomposed wood sheets from said second block in a direction parallel to a pre-established cutting plane, thus obtaining final sheets of wood presenting grains with desired amounts of alternate bands of at least one of different widths, appearance and porosity.

2. Method as claimed in claim 1, comprising the use of glue or an adhesive substance, for forming the first and second blocks of precomposed wood, of a transparent, white and/or colored nature.

3. Method as claimed in claim 1, in which said sheets of natural wood, said first and second sheets of precomposed wood used for preparing blocks of precomposed wood, present thicknesses ranging from approximately 0.2 to 3 mm.

4. Method as claimed in claim 1, in which the sheets of natural wood are of identical thickness.

5. Method as claimed in claim 1, in which the sheets of natural wood are of different thicknesses.

6. Method as claimed in claim 1, in which the block of precomposed wood is formed by overlapping one or more sheets of natural wood and one or more sheets of precomposed wood.

7. Method as claimed in claim 1, in which the sheets of natural wood are of the same color as the wood originally used.

8. Method as claimed in claim 1, in which the sheets of natural wood are colored or dyed.

9. Method as claimed in claim 1, in which the sheets of natural wood are obtained by rotary cutting a log of natural wood.

10. Method as claimed in claim 1, in which said second block of precomposed wood comprises second sheets of precomposed wood obtained by cutting from a first block of precomposed wood made up of sheets of natural wood obtained by rotary cutting and/or tangential slicing and/or radial slicing of a log of at least one species of wood.

11. Method as claimed in claim 1, in which the sheets of natural wood used for preparing the second sheets of precomposed wood are dyed of colored.

12. Method as claimed in claim 1, in which said first block of precomposed wood is made up of sheets of natural wood belonging to the same species of wood.

13. Method as claimed in claim 1, in which said first block of precomposed wood is made up of sheets of natural wood belonging to different species of wood.

14. Method as claimed in claim 1, in which said first block of precomposed wood is made up of sheets of natural wood of the same thickness or of different thicknesses.

15. Method as claimed in claim 1, in which said second sheets of precomposed wood are sliced parallelly to a cutting plane transverse to planes of the wood sheets making up said first precomposed block.

16. Method as claimed in claim 1 further comprising the step of forming a third block of precomposed wood by means of second sheets of precomposed wood obtained by cutting a second block of precomposed wood intermediate to said first and third precomposed blocks.

17. Method as claimed in claim 16, in which the first sheets of precomposed wood utilized for forming said second block of precomposed wood are dyed or colored.

18. Method as claimed in claim 16, in which said first sheets of precomposed wood utilized for forming said second block of precomposed wood are of equal or different thicknesses.

19. Method as claimed in claim 16, in which said second sheets of precomposed wood, are cut parallel to a cutting plane transverse to the planes of the sheets of precomposed wood forming said second precomposed block.

20. Method as claimed in claim 16, comprising the step for producing a third sheet of precomposed wood, by cutting said sheets from said second precomposed block, according to cutting planes parallel to, and/or forming an angle with the planes of the wood sheets making up the second block.

21. Method as claimed in claim 16, comprising the step of forming said third block of precomposed wood, by alternating at least one sheet of natural wood, with at least one of said first sheets of precomposed wood and/or with at least one of said second and/or said third sheets of precomposed wood.

22. Method as claimed in claim 16, comprising the step of forming said third block of precomposed wood, by alternating at least one sheet of natural wood, with at least one of said first sheets of precomposed wood.

23. Method as claimed in claim 16, comprising the step of forming said third block of precomposed wood, by alternating at least one sheet of natrual wood, with at least one of said second sheets of precomposed wood.

24. Method as claimed in claim 16, comprising the step of forming said third block of precomposed wood, by alternating at least one sheet of natural wood, with at least one of said third sheets of precomposed wood.

* * * * *